Feb. 16, 1943. C. H. CARR 2,311,155
HEAT EXCHANGE APPARATUS
Filed March 26, 1938
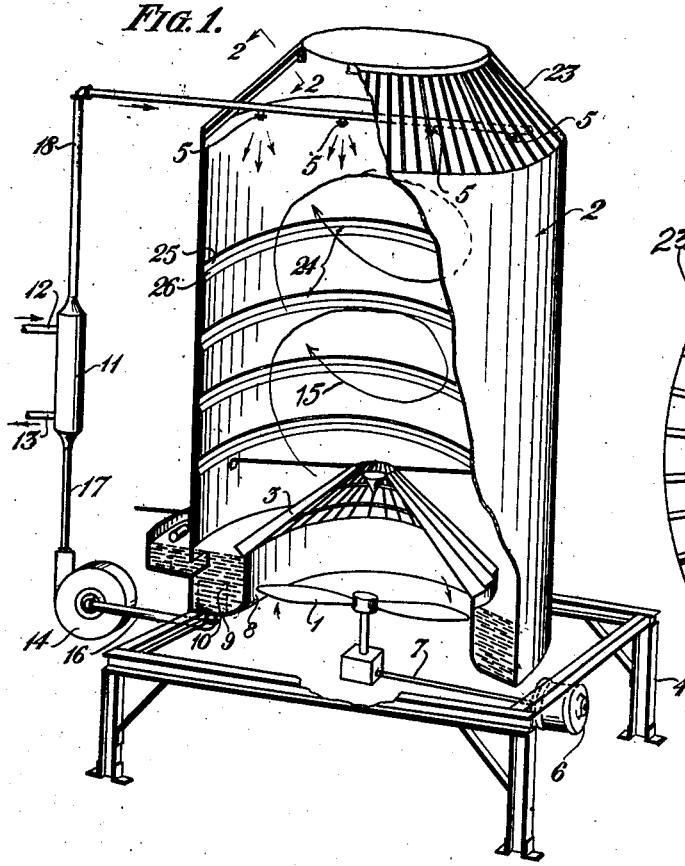
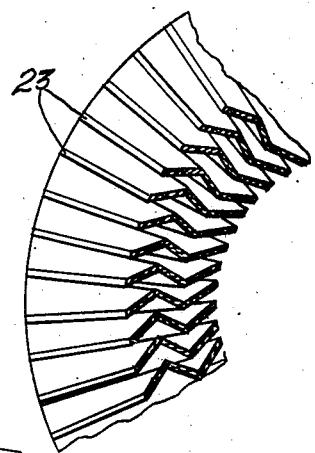
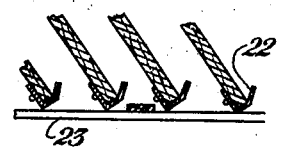
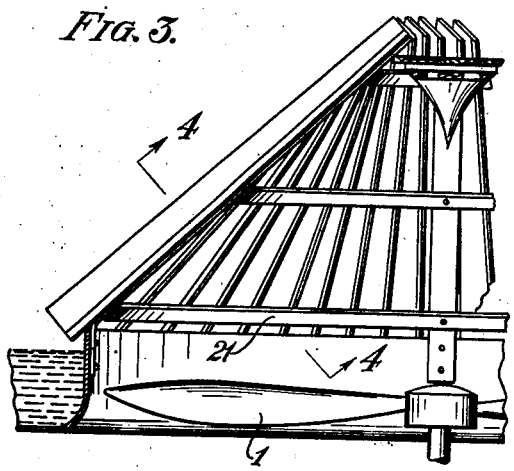
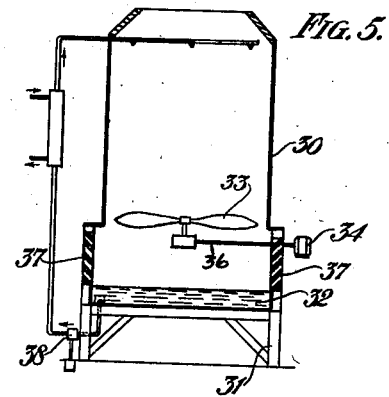
INVENTOR
*Clifford H. Carr*
BY *John L. Thiegruff*
ATTORNEY Patented Feb. 16, 1943

2,311,155

UNITED STATES PATENT OFFICE 2,311,155

HEAT EXCHANGE APPARATUS

Clifford H. Carr, Kansas City, Mo.

Application March 26, 1938, Serial No. 198,239

3 Claims. (Cl. 261—30)

The present invention relates to heat exchange apparatus and is more particularly directed to apparatus of the so-called cooling tower type adapted to transfer heat between liquid and gaseous mediums.

More particularly the invention relates to apparatus in which liquid may be sprayed in comminuted form in contact with a gas from, or, to which it is desired to transfer heat.

The general object of the invention is to provide heat exchange apparatus of the type described having increased efficiency and which shall have reduced initial cost and maintenance.

Another major object is to provide a cooling tower in which maximum cooling efficiency is attained and in which a maximum effective height is obtained with a minimum of actual height.

In cooling towers of the type under consideration there are several factors which must be taken into account. Since such towers are particularly designed for installation on roofs of buildings, it is a prime requisite that the overall height be kept at a minimum. It will be readily apparent that in such installations the fans, or air impelling means, should be kept as low as possible in order not to require heavy supporting construction. Also noises from the fan and motor, as well as from the falling water must be kept at a minimum or, at least, isolated from the building.

Another prime desideratum in such towers when used for cooling liquids is maximum evaporation whereby heat is absorbed from the liquid. By completely saturating the circulated air, the amount of air required is reduced and consequently the power required is likewise reduced. It is also desirable to keep the drift loss, or water entrapped in the air in the form of small droplets, at a minimum by keeping the discharge velocity of the air small and providing means to separate all of the entrapped water from the air or other gas.

Prior to my invention, cooling towers of the general type under consideration have failed to meet all the above requirements and have had either excessive discharge velocity with large amount of entrapped water with resultant loss of cooling water, poor distribution of air, excessive actual height and, or, have been noisy.

Therefore, a further major object is to overcome the above undesirable features.

A more specific object of the present invention is to provide an improved cooling tower having increased capacity by effecting a maximum of contact of a given volume of air with the water to be cooled.

Another object is to provide a cooling tower in which the air is caused to flow in a spiral path in a counter-direction to the water spray.

A further object is to provide a construction in which the power required to maintain the flow of air is reduced to a minimum consistent with the improved cooling efficiency.

A still further object is to provide a cooling tower having the above advantages while at the same time keeping the loss of water by drift of spray from the tower at a minimum.

Other and further objects will become apparent from the following description together with the accompanying drawing, in which:

Figure 1 is a partial sectional perspective view of a cooling tower embodying the invention.

Figure 2 is a fragmental sectional view taken on line 2—2 of Figure 1.

Figure 3 is an enlarged partial elevation of the means for imparting a whirling action to the air delivered by the fan upward against the downwardly sprayed cooling water and to prevent water from falling through the fan.

Figure 4 is a fragmental sectional view taken on line 4—4 of Figure 3.

Broadly speaking, the present invention contemplates an improved heat exchange apparatus of the type in which a liquid to be cooled or heated is sprayed in comminuted form and a draft of air or other gas is maintained in contact therewith in such a manner that the effective length of path of contact is increased without unduly increasing the dimensions of the apparatus or increasing eddy current loss.

Although in the accompanying specification an embodiment of the invention is illustrated and described as applied to water cooling apparatus, it is to be understood that the invention, in its broadest aspect, may be used to heat the water where it is desired to recover heat from hot gases. Also the apparatus may be used with a refrigerator condenser and may also be used with a condenser of gases in refining processes. For clarity and simplicity, the apparatus will be referred to as a cooling tower.

The increase in effective length or height of tower is accomplished by allowing the comminuted water to fall under the action of gravity while a current or draft of air is impelled, preferably upwardly in a spiral path. The eddy current or static head loss is kept low by utilizing and mounting air impelling means of such a type and in such a manner that substantially the full volume of air inside of the tower and in contact with the water flows without substantially eddy currents in a spiral path.

Referring to the drawing, an embodiment of the invention is illustrated wherein a fan 1 of a screw or axially flow propeller type is mounted coaxially with a cooling tower 2 and is adapted to deliver a stream of air substantially as large in cross sectional area as that of the interior of the tower 2. Such a construction and arrangement makes it possible to deliver the largest amount of air with a minimum loss of static head and eddy currents and consequently with a saving in power.

Above the fan 1 is mounted a series of deflector louvres 3 which are inclined in such a manner that the natural tendency of the air, delivered by the fan 1, to whirl will be increased and the air will travel in a spiral path upwardly toward the top of the tower 2. Water to be cooled is delivered in comminuted or spray form by nozzles 5 arranged in the top of the tower.

For purposes of illustration, the apparatus comprising the essentials of the invention is shown as mounted on a frame 4 of any suitable construction. The frame 4 is usually mounted on the roof of a building to conserve space. The fan 1 is adapted to be driven in any suitable manner as by means of a motor 6 which is coupled to the fan 1 through a suitable shaft and gear mechanism 7.

The lower part of the tower 2 is provided with a cylindrical casing 8, which may be curved if desired into the form of a Venturi tube, concentric with the fan 1 and annular flange 9 extends to the bottom edge of the tower to form a curved inlet housing for the fan and to form an annular reservoir 10 for receiving the water collected from the spray nozzles 5.

The cooling apparatus is shown as adapted to be used in connection with a heat exchange device 11 having a delivery conduit 12 for the steam or gas to be condensed and a return conduit 13 for returning condensate or liquor. Means are provided for circulating the cooling water through the jacket of the condenser 11. To this end, a suitable pump 14 is adapted to draw the water through conduit 16 from the reservoir 10 at the bottom of the tower 2 and deliver it through conduit 17 to the heat exchange device 11 and through conduit 18 to spray nozzles 5. These nozzles are preferably of the type designed to produce a very fine spray in order to obtain maximum surface area of the comminuted water particles with which the counter flow of the air may come in contact for maximum heat exchange from the water to the air. The falling particles of water are directed into the reservoir 10 by the deflector louvres 3, which also serve to direct the upwardly flowing air from the fan in spiral paths generally indicated by the arrows 15. The fan 1 being of the propeller type and operating at a comparatively low speed inherently imparts a whirling action to the air and the louvres 3 are supported by any suitable framework 21 in a circumferential or multi-sided series in such a manner that the longitudinal axes of the louvres form the elements of a frustrum of a cone. The individual louvres are inclined about the axes, as clearly shown in Figure 4, so that air travelling upwardly will be caused to spiral in a clockwise direction when viewed from above the louvres.

The louvres may be made of suitable boards, as shown in Figure 4, or sheet metal. In either event, the lower edges are provided with gutters 22 which collect the falling water and direct it into the annular tank or reservoir 10. The inclination of the louvers, the spacing thereof, and the arrangement of the gutters on the louvers is such that the water falling straight down will be prevented from dropping onto the fan 1.

For the purpose of reducing loss of cooling water, means are provided in the form of eliminators 23 at the top of the tower for purpose of removing entrapped moisture from the air. To this end, the eliminators are provided in zigzag formations arranged in a circular or multi-sided series and their longitudinal axes are inclined inwardly and upwardly from the top of the tower to form a frustrum of a cone. This construction increases the area in contact with the discharged air and reduces the air resistance. If desired, the eliminators may be arranged in a horizontal plane. The eliminators may be made of boards, suitably fastened together, illustrated in the fragmentary section in Figure 2, or may be made of sheet metal. Since the construction, per se, of these eliminators form no part of the invention and are of the type well known in the art, further detailed description is believed unnecessary.

In order that the water spray striking the sides of the tower 2 may be prevented from running down the sides thereof and thereby fail to be subjected to the full effect of the draft of the air from the fan, suitable drip rings 24 are secured to the inside of the tower. These rings may have a cylindrical portion 25, which may be held to the wall of the tower by riveting, welding or brazing and a conical inwardly extending flange 26 for directing the water inwardly away from the walls of the tower.

In all heat exchange or evaporating apparatus the capacity increases in direct relation to the relative velocity of the heat convection mediums. Likewise, the evaporation rate from a drop of water under a given set of conditions is increased in proportion to the velocity of the air over the drop. The reduction in temperature of the water droplets is also dependent upon the amount of evaporation from each drop. Also from the standpoint of efficiency it is highly desirable to have all of the air circulated in contact with the falling water become substantially saturated with water evaporated from the water droplets in order that all of the potential cooling capacity of the volume of circulated air may be utilized.

When warm, unsaturated air passes in contact with a spray of water at a temperature above the wet bulb temperature of the air, some of the water is evaporated into a gas or vapor form, and thus cools the remaining water by extracting heat therefrom. The amount of evaporation can be increased by increasing the volume of air passed in contact with the water per unit of time. For practical reasons it is not desirable for the air velocity to exceed approximately 400 feet per minute leaving the tower on account of friction loss through outlet louvres.

The efficiency of a cooling tower of the type under consideration may be expressed $$\text{Efficiency} = \frac{Wh - Wc}{Wh - WB}$$

where $Wh$ is the temp. of hot water delivered to the sprays; $Wc$ is the temp. of the water leaving the tower; $WB$ is the wet bulb temp. of the air entering tower; that is, the temperature at which the moisture in the air will cause it to be saturated with constant total heat.

From the above, it will be seen that for a given set of conditions of relative humidity and quantity of air, the tower efficiency becomes greater as the wet bulb temperature of the air leaving the tower becomes higher and approaches the temperature of the water entering the tower from the spray nozzles. In other words, maximum cooling efficiency is obtained when all of the potential cooling capacity of the volume of air is utilized, that is, when the air is saturated just at the temperature of the water entering the tower. This condition is approached as uniform velocities and distribution of air and water are obtained for a time sufficient to permit the transfer of heat. For this reason the spiral path of the air increases the efficiency of the tower without increasing the actual length or height of the tower.

Without departing from the scope of the invention, it will be evident that the metal annular casing 2 may be replaced by a casing or structure having a plurality of plane sides which may be fabricated or made up of wooden boards in a manner well known in the art. Likewise, instead of a single pipe carrying the nozzles 5, as shown in Figure 6, a plurality of branches may be provided in order that the nozzles may be located and distributed evenly at the upper end of the tower.

The present invention provides an apparatus in which the maximum relative velocity between the air and the water is maintained by causing the air to flow counter to the water while at the same time keeping the resistance to air flow a minimum and the eddy current losses of the air at a minimum. This is done by providing a tower in which a propeller type fan delivers a draft of air substantially throughout the full cross section of the tower. By mounting the fan in the bottom of the tower the tendency for some of the air to be short circuited is reduced. The present construction has a minimum of obstructions or abrupt changes of direction in the air stream resulting in a minimum of eddy current losses and consequently reduced power consumption.

While I have herein shown and particularly described some embodiments of my invention, I do not wish it to be understood that I intend to limit the invention to precise constructions herein shown and particularly described, as it will be readily apparent to those skilled in the art that many modifications may be made without departing from the spirit of the invention.

Having described my invention, I claim:

1. A heat exchange apparatus comprising an upright casing having vertical openings in its ends, fluid distributing apparatus substantially at the upper end of said casing to evenly distribute fluid in comminuted form throughout the area of said casing for gravitation downwardly, a propeller fan of large diameter mounted coaxially with the lower end of the casing and designed to impel air vertically into said casing, means above said fan for causing said air to spiral smoothly upwardly and thus make the length of travel in contact with the comminuted fluid greater than the vertical distance between said deviating means and the upper end of said casing.

2. A heat exchange apparatus comprising an upright casing having vertical openings in its ends, fluid distributing apparatus substantially at the upper end of said casing to evenly distribute fluid in comminuted form throughout the area of said casing for gravitation downwardly, a propeller fan of large diameter mounted coaxially within the lower end of the casing and designed to impel air vertically into said casing, means above said fan for deviating the path of said air to make the length of travel in contact with the comminuted fluid greater than the vertical distance above said deviating means and means carried by said deviating means to collect and to carry the comminuted fluid radially beyond the periphery of said fan.

3. A heat exchange apparatus comprising an upright casing, fluid distributing means adjacent the upper end of said casing for distributing liquid in comminuted form for gravitation downwardly, a relatively short and substantially coaxial tube at the lower extremity of said casing to form an air inlet, means between said upright casing and said tube forming an annular catch basin, a propeller type fan mounted coaxially with said tube for rotation therein and designed to impel air spirally and progressively upward of said casing, means above said fan comprising deflecting louvres for directing the falling liquid into said annular catch basin and for enhancing the inherent whirling action of the air from said fan, the diameter of said fan being sufficient to deliver a stream of air having a cross sectional area sufficient to prevent substantial eddy currents and recirculation of air within said casing.

CLIFFORD H. CARR.